United States Patent
Rohrmoser et al.

[11] Patent Number: 5,992,122
[45] Date of Patent: Nov. 30, 1999

[54] ATTACHMENT ELEMENT

[75] Inventors: Günter Rohrmoser, Meiningen, Austria; Markus Sprenger, Eschen, Liechtenstein; Franz Rass, Oberndorf/T., Austria

[73] Assignee: Hilti Aktiengesellschaft, Schaan, Liechtenstein

[21] Appl. No.: 08/967,990

[22] Filed: Nov. 12, 1997

[30] Foreign Application Priority Data

Nov. 12, 1996 [DE] Germany ............................ 196 46 951

[51] Int. Cl.⁶ ............................ E04B 1/38; F16B 43/00
[52] U.S. Cl. .................... 52/698; 52/512; 52/515; 52/410; 52/408; 411/147; 411/151; 411/369; 411/533; 411/368
[58] Field of Search ............................ 52/698, 512, 515, 52/410, 408, 467; 411/147, 151, 164, 163, 368, 531, 369, 533

[56] References Cited

U.S. PATENT DOCUMENTS

| | | | |
|---|---|---|---|
| 2,165,500 | 7/1939 | Muirhead | 52/410 |
| 2,537,575 | 1/1951 | Crowther | 411/134 |
| 3,090,203 | 5/1963 | Durget | 52/169.1 X |
| 4,467,581 | 8/1984 | Francovitch | 52/515 |
| 4,476,660 | 10/1984 | Francovitch | 52/515 |
| 4,518,282 | 5/1985 | Wilcox et al. | 405/259 |
| 4,574,551 | 3/1986 | Giannuzzi | 52/512 |
| 4,658,558 | 4/1987 | Verble | 52/410 |
| 4,763,456 | 8/1988 | Giannuzzi | 52/410 |
| 4,907,927 | 3/1990 | Choiniere | 411/368 |
| 5,102,275 | 4/1992 | Hulsey | 411/134 |
| 5,267,423 | 12/1993 | Giannuzzi | 52/410 |
| 5,638,655 | 6/1997 | Keck | 52/713 |
| 5,797,232 | 8/1998 | Larson | 52/408 |
| 5,908,278 | 6/1999 | Hasan et al. | 411/533 |
| 5,915,903 | 6/1999 | Osterle et al. | 411/531 |
| 5,934,855 | 8/1999 | Osterle et al. | 411/545 |

*Primary Examiner*—Carl D. Friedman
*Assistant Examiner*—Jennifer I. Thissell
*Attorney, Agent, or Firm*—Brown & Wood, LLP

[57] ABSTRACT

A plate-shaped cambered attachment element (1) for attaching a constructional element (9) to a foundation (7) and having a central bore (2) for receiving an anchoring element (11), an abutment shoulder (4) spaced from the base (3) of the attachment element (1) and extending toward the base (3), and an edge region (5) which extends toward the plate edge (6) of the attachment element (1) and extends to a plane, extending perpendicular to the axis of the core (2), at a shallow angle (W).

7 Claims, 1 Drawing Sheet

ATTACHMENT ELEMENT

BACKGROUND OF THE INVENTION

1. Field of the Invention

The present invention relates to a plate-shaped cambered attachment element for securing a constructional element on a foundation, with the attachment element having a free, circumferentially closed plate edge, a base, a central bore for receiving an anchoring element (11) an abutment shoulder which surrounds the bore, is spaced from the base in a direction parallel to the axis of the bore and extends in a direction toward the plate edge.

2. Description of the Prior Art

For securing a constructional element on an upper surface of a foundation, an attachment element disclosed, e.g., in DE 40 19 157, can be used. This attachment element has a plate-shape camber, an edge region formed by a flat annular ring, a free, circumferentially closed plate edge, a central bore, a base, and an abutment shoulder. An anchoring element, which is secured in a foundation, extends through the bore. The edge region, which is formed as a flat annular ring extends in a plane extending perpendicular to the bore axis. The abutment shoulder, which is spaced from the base in a direction parallel to the bore axis, extends toward the plate edge, and engages the constructional element, provides for pulling of the attachment element toward the upper surface of the foundation by the anchoring element.

The edge region of this attachment element, which is formed as a flat annular ring, imparts to the attachment element a very high form stability or rigidity, in particular in a vertical direction, and this attachment element is not suitable, e.g., for securing constructional elements subjected to action of abrupt tensile forces. Such abrupt tensile forces, acting on a constructional element, occur, e.g., when a constructional element, which is secured on a foundation formed by spaced from each other supports, is abruptly loaded so that it sags between the supports, becoming deformed.

In particular, when abrupt tensile forces are generated, the sagging may occur in such a manner that the bore of the attachment element radially expands until the attachment element can be pulled off the anchoring element. There exists a danger of the anchoring element being damaged and of the connection between the anchoring element and the foundation being destroyed.

Accordingly, an object of the present invention is to provide an attachment element which would insure a reliable attachment of a constructional element to a foundation, would resiliently absorb the tensile forces within a predetermined range of the tensile forces, and would indicate when the tensile forces exceed the predetermined range of the tensile forces.

SUMMARY OF THE INVENTION

This and other objects of the present invention, which would become apparent hereinafter, are achieved by forming the edge region so that it extends at a shallow angle to the plane, which extends perpendicular to the bore axis, and points toward the free plate edge. By providing an edge region, which extends at a shallow angle to a plane extending perpendicular toward the core axis, an elastic behavior of the attachment element in a direction parallel to the bore axis is achieved. The abrupt tensile forces acting on the constructional element, which lie below the maximum allowable tensile force of the attachment point, can be thus resiliently compensated by the attachment element, without causing any damage to the attachment element, the anchoring element or the connection between the anchoring element and the foundation. The elastic, resilient behavior of the attachment element also insure that the constructional element is pressed against the foundation when no or only small tensile forces act on the constructional element.

When the abrupt tensile forces exceed the maximum allowable tensile force of the attachment point, the attachment element is plastically so deformed that the plate edge of the attachment element is spaced from the upper surface of the constructional element when the constructional element remains in its attachment position and lies on the foundation. The spacing of the plate edge from the upper surface of the constructional element indicates that the tensile force exceeds the allowable tensile force.

In order to achieve a uniform deformation of the attachment element from abutment shoulder to the plate edge, the edge region preferably extends radially from the circumferential region of the abutment shoulder toward the plate edge.

By varying the inclination of the edge region toward the plane defined by the plate edge, the tensile force, which is absorbed by the attachment element, can be controlled. Advantageously, the edge region extends to a plane, which lies perpendicular to the bore axis, at angle from 150° to 450°.

In order to achieve a uniform deformation behavior of attachment elements having different outer diameters, it is necessary that the attachment elements have different heights corresponding to their respective outer diameters. Preferably, the height of an attachment element in a direction parallel to the bore axis corresponds to 0.06÷0.16 of the outer diameter of the attachment element.

The wall thickness of the attachment element also influences its elastic behavior. Thus, an attachment element having a small wall thickness is characterized by a weaker elastic behavior than an attachment element with a larger wall thickness. Advantageously, the wall thickness of an attachment element corresponds to 0.01÷0.04 of its outer diameter.

The abutment shoulder of the attachment element cooperates with a shoulder provided on the anchoring element. Therefore, this shoulder and a region of the anchoring element, which extends in a pulling direction and adjoins the shoulder, do not axially project beyond the base. Advantageously, the abutment shoulder extends substantially flash with the plate edge.

In order to be able to use the attachment element according to the invention outdoor or in chemically active regions, advantageously, the attachment element is made of a stainless steel. The anchoring element can likewise be made of stainless steel.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PRESENT INVENTION

Figure 1:
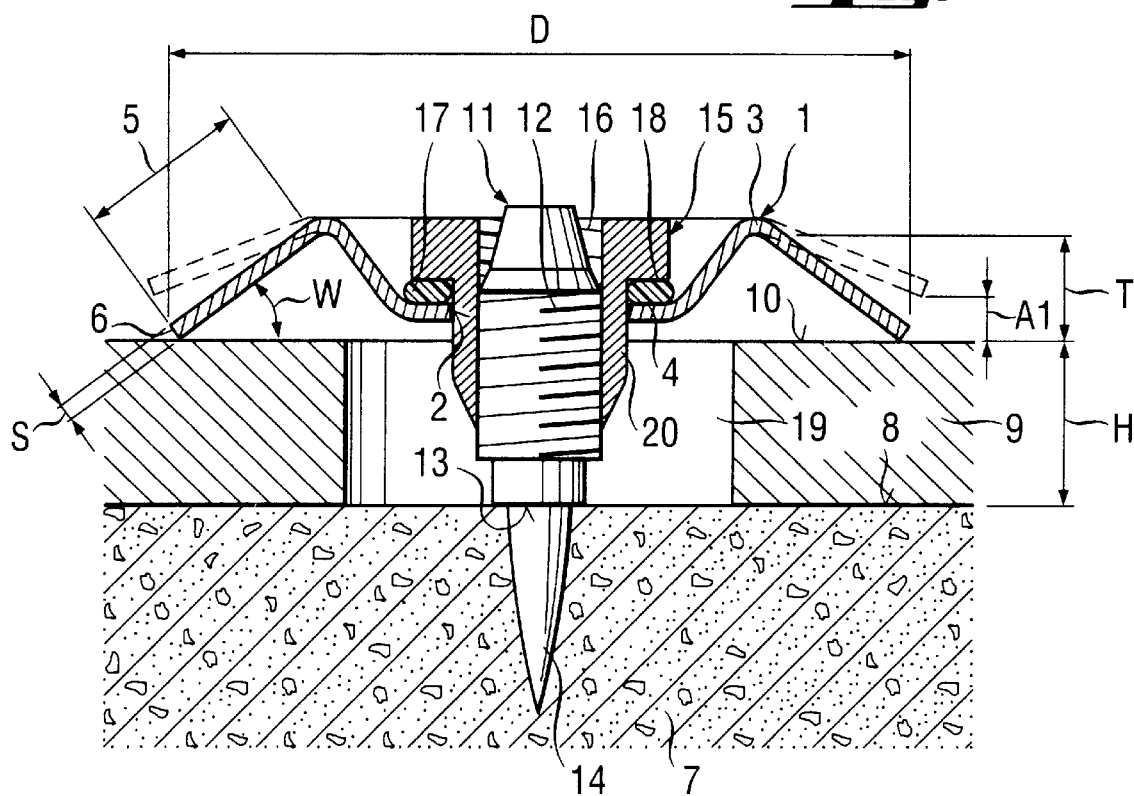
FIG. 1 is a cross-sectional view of an attachment element according to the present invention secured in a foundation with its plate edge being pressed against an upper surface of a constructional element.
Figure 2:
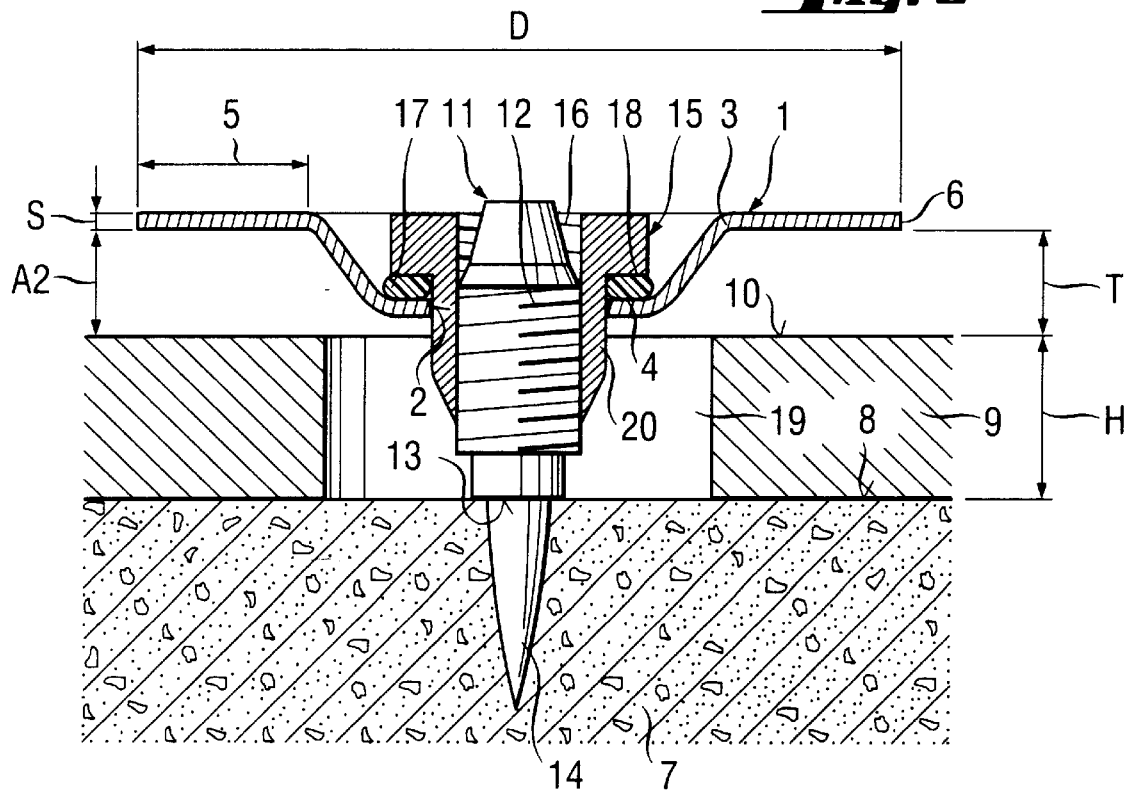
FIG. 2 is a cross-sectional view of the plastically deformed attachment element shown in FIG. 1, with its plate edge being spaced from the constructional element.

FIGS. 1 and 2 show, in a simplified form, a constructional plate-shape element 9 having a height H, which lies on an upper surface 8 of a foundation 7. The foundation 7, which is not shown in its entirety, is formed of several, spaced from each other, supports, with the constructional element 9 extending over at least two supports. The schematically shown support is formed of cement. The constructional element 9 has a bore 19 which extends perpendicular to the upper surface 8 of the foundation 7. An attachment element 1 according to the present invention serves for securing the constructional element 9 to the foundation 7. The attachment element 1 is secured to the foundation 7 with a pressure member 15, a cushion member 17, and an anchoring element 11.

The attachment element is formed as a plate-shaped cambered element and has a plate edge 6 and a base 3 spaced from the edge 6. The height T of the attachment element corresponds to the distance between the edge 6 and the base 3. An edge region 5 extends from the circumferentially closed edge 6 toward the base 3. The edge region 5 extends at a shallow angle (W) to a plane 10 which is perpendicular to the axis of a central bore 2, which angle points to the edge 6. The inclination of the edge region corresponds to an angle of about 35°. The bore 2 is located in a central region of the central attachment element 1. The attachment element has, in the circumferential region of the central bore 2, an abutment shoulder 4 which surrounds the bore 2, extends toward the edge 6 and is spaced from the base 3 in a direction parallel to the axis of the central bore 2.

The abutment shoulder 4 is substantially circular and extends substantially flash with the edge 6. The transitional region between the abutment shoulder 4 and the edge region 5 is substantially round. The outer diameter of the attachment element 1 is defined by the edge 6. The diameter of the bore 19 in the constructional element 9 substantially corresponds to the diameter of the transitional region between the abutment shoulder 4 and the edge region 5.

The anchoring element 11, which extends through the attachment element 1, has an anchor region 14 driven into the foundation 7 by an explosive powder charge-operated setting tool (not shown). A counter-surface 13 of tile anchoring element 11, which is located opposite the attachment element 1 and above the anchor region 14, is supported on the upper surface 8 of the foundation 7. On a side of the counter-surface 13 remote from the anchor region 14, there is provided an outer thread 12 the diameter of which exceeds the diameter of the counter-surface 13. The pressure member 15 is screwed onto the anchoring element 11 and is provided to this end with an inner thread 16. The pressure member 15 has a substantially cylindrical stem region 20 the outer diameter of which corresponds substantially to the diameter of the central bore 2 of the attachment element 1. At the end of the stem region 20, there is provided a radially widened region which is defined by a shoulder 18 extending toward the base 3 of the attachment element 1 and having a wrench across-flats dimension (not shown). Between the shoulder 18 and the abutment shoulder 4, there is provided the cushion member 17 for absorbing tensile forces acting on the attachment element 1 and transferring them to the anchoring element 11. The sum of heights of the cushion member 17 and the radially widened region of the pressure member 15, taken parallel to the longitudinal direction of the anchoring element 11, substantially corresponds to the distance between the abutment shoulder 4 and the base 3. The wall thickness s of the attachment element 1 corresponds, e.g., to about 0.02 of the outer diameter D of the attachment element 1.

The securing of the constructional element 9 in the foundation 7 is effected as follows. The anchor region 14 of the anchoring element 11, which passes through the bore 19 of the constructional element 9, is driven into the foundation 7 by an explosive powder charge - operated setting tool (not shown). Then, the constructional element 9, together with the cushion member 17 and the pressure member 15, are mounted on the anchoring element 11 by rotating the pressure member 15. By rotating the pressure member 15, the attachment member 1 is displaced toward the constructional element 9 until the attachment element 1, as shown in FIG. 1, engages the upper surface 10 of the constructional element 9 with a prestress. The attachment element becomes somewhat deformed, and the edge 6 moves somewhat closer to the base 3, with the height of the attachment element 1 becoming somewhat smaller. The pressure member 15 is rotated with a tool (not shown), e.g., a wrench which engages the across-flat dimension of the pressure member 15. In addition to the deformation of the attachment element as a result of the prestress, the attachment element 1 is further elastically deformed under the action of tensile forces which are developed in the constructional element 9. The deformation proceeds so that the edge 6 moves toward the base 3 maximum by amount A1. Thereby, the inclination of the edge region 5 to the plane, which extends perpendicular to the axis of the core 2, becomes flatter.

If the tensile force exceeds the allowable tensile force of attachment points, then a further plastic deformation of the attachment element 1 takes place, as shown in FIG. 2, which causes the displacement of the edge 6 toward the base 3 by amount A2, without damaging the anchoring element 11. After the removal or reduction of the tensile force, the distance between the upper surface 10 of the constructional element 9 and the edge 6 is clearly visible. This distance indicates that overtensioning of the attachment points occurred. Thus, a reliable securing of the constructional element 9 can be achieved by selection of an appropriate attachment element 1.

The attachment element 1 is so formed that any damage of,the pressure member 15 and the anchoring element 11 is prevented when the constructional element 9 moves in the pull direction a distance exceeding A2. The bore 2 can increase in radial direction so that the attachment element 1 can be pulled over the pressure member 15.

Though the present invention was shown and described with reference to the preferred embodiments, various modifications thereof will be apparent to those skilled in the art and, therefore, it is not intended that: the invention be limited to the disclosed embodiments or details thereof, and departure can be made therefrom within the spirit and scope of the appended claims.

What is claimed is:

1. A plate-shaped cambered attachment element (1) for securing a constructional element (9) on a foundation (7), the attachment element (1) comprising a free, circumferentially closed plate edge (6); a base (3); a central bore (2) for receiving an anchoring element (11); an abutment shoulder (4) which surrounds the bore (2), is spaced from the base (3) in a direction parallel to an axis of the bore (2) and extends in a direction toward the plate edge (6); and an elastic resilient edge region (5) extending from the plate edge (6) and extending at a shallow angle (W) to a plane extending perpendicular to the axis of the bore (2), with the angle (W) pointing toward the plate edge (6).

2. An attachment element according to claim 1, wherein the edge region (5) extends, in a radial direction, from a circumferential region of the abutment shoulder (4) toward the plate edge (6).

3. An attachment element according to claim 1 or 2, wherein the edge region(5) extends to the plane, which extends perpendicular to the axis of the central bore (2) at angle from 15° to 45°.

4. An attachment element according to claim 1 wherein the attachment element (1) has a height(T), in a direction parallel to the axis of the central bore (2), corresponding to 0.06÷0.16 of an outer diameter (D) of the edge region (5).

5. An attachment element according to claim 1, wherein the attachment element (1) has a wall thickness (S) corresponding to 0.01÷0.04 of an outer diameter (D) of the attachment element (1).

6. An attachment element according to claim 1, wherein the abutment shoulder (4) extends substantially flash with the plate edge (6).

7. An attachment element according to claim 1, wherein the attachment element is formed of a stainless steel.

* * * * *